(12) United States Patent
Carrette et al.

(10) Patent No.: US 8,765,088 B2
(45) Date of Patent: Jul. 1, 2014

(54) ABSORBENT SOLUTION CONTAINING A THIADIAZOLE-DERIVED DEGRADATION INHIBITOR AND METHOD FOR LIMITING THE DEGRADATION OF AN ABSORBENT SOLUTION

(75) Inventors: Pierre-Louis Carrette, Lyons (FR); Bruno Delfort, Paris (FR)

(73) Assignee: IFP Energies nouvelles, Rueil Malmaison Cedex (FR)

( * ) Notice: Subject to any disclaimer, the term of this patent is extended or adjusted under 35 U.S.C. 154(b) by 658 days.

(21) Appl. No.: 13/001,239

(22) PCT Filed: Jun. 23, 2009

(86) PCT No.: PCT/FR2009/000775
§ 371 (c)(1),
(2), (4) Date: Dec. 23, 2010

(87) PCT Pub. No.: WO2009/156619
PCT Pub. Date: Dec. 30, 2009

(65) Prior Publication Data
US 2011/0110834 A1    May 12, 2011

(30) Foreign Application Priority Data

Jun. 27, 2008   (FR) ..................................... 08 03683

(51) Int. Cl.
*B01D 53/40*    (2006.01)
*C07D 285/125*  (2006.01)
*C07D 417/02*   (2006.01)
*C07D 487/12*   (2006.01)
*C07D 487/14*   (2006.01)
*C09K 3/00*     (2006.01)
*B01D 53/52*    (2006.01)
*B01D 53/62*    (2006.01)
*B01D 53/78*    (2006.01)

(52) U.S. Cl.
USPC ........... 423/228; 423/220; 548/136; 548/142; 252/184

(58) Field of Classification Search
USPC .................................... 548/136, 142; 423/210
See application file for complete search history.

(56) References Cited

U.S. PATENT DOCUMENTS

| | | | |
|---|---|---|---|
| 2,655,543 A | 10/1953 | Linch et al. | |
| 4,910,210 A * | 3/1990 | Beriger et al. | ................. 514/363 |
| 5,686,016 A | 11/1997 | Veldman et al. | |
| 7,056,482 B2 | 6/2006 | Hakka et al. | |
| 2008/0216705 A1 * | 9/2008 | Hayes et al. | ................ 106/14.44 |

FOREIGN PATENT DOCUMENTS

| | | |
|---|---|---|
| EP | 0 592 956 A1 | 4/1994 |
| EP | 1 582 250 A2 | 10/2005 |
| FR | 2 820 430 | 8/2002 |
| FR | 2 900 842 A1 | 11/2007 |
| WO | WO 2005/035700 A1 | 4/2005 |

OTHER PUBLICATIONS eMolecules.com, "CAS No. 3030-47-5." (c) 2013 eMolecules, Inc. Viewed Oct. 24, 2013 at http://www.emolecules.com/cgi-bin/more?vid=501819.*

* cited by examiner

*Primary Examiner* — Stuart Hendrickson
*Assistant Examiner* — Daniel Berns
(74) *Attorney, Agent, or Firm* — Antonelli, Terry, Stout & Kraus, LLP.

(57) ABSTRACT

The degradation of an absorbent solution comprising organic compounds having a amine function in aqueous solution is substantially reduced in the presence of a small amount of thiadiazole-derived degradation inhibiting agents defined by the general formula as follows:

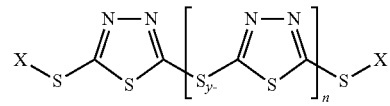

The absorbent solution is used to deacidize a gaseous effluent.

9 Claims, No Drawings

ABSORBENT SOLUTION CONTAINING A THIADIAZOLE-DERIVED DEGRADATION INHIBITOR AND METHOD FOR LIMITING THE DEGRADATION OF AN ABSORBENT SOLUTION

FIELD OF THE INVENTION

The present invention relates to the sphere of gaseous effluent deacidizing. More precisely, the present invention provides compounds for reducing the degradation of an absorbent solution used to absorb the acid compounds contained in a gaseous effluent, the absorbent solution comprising amines in aqueous solution.

BACKGROUND OF THE INVENTION

Deacidizing gaseous effluents such as, for example, natural gas and combustion fumes is generally carried out by washing with an absorbent solution. The absorbent solution allows to absorb the acid compounds present in the gaseous effluent ($H_2S$, mercaptans, $CO_2$, COS, $SO_2$, $CS_2$).

Deacidizing these effluents, notably decarbonation and desulfurization, imposes specific constraints on the absorbent solution, in particular thermal and chemical stability, notably to the effluent impurities, i.e. essentially oxygen, SOx and NOx.

The most commonly used absorbent solutions are aqueous alkanolamine solutions. Document FR-2,820,430, which provides deacidizing methods for gaseous effluents, can be mentioned.

However, it is well known to the person skilled in the art that these amines have the drawback of degrading under the conditions of use.

In particular, amines can be degraded by oxygen forming acids such as, for example, formic acid, acetic acid or oxalic acid in amine solutions.

These acids react with the amines according to an acid-base reaction and form salts referred to as Heat Stable Salts (HSS) or Heat Stable Amine Salts (HSAS). These acids are stronger acids than carbonic acid (formed by the reaction of $CO_2$ with water). The salts they form by reaction with the amines are thus not regenerated in the regeneration column under normal unit operating conditions and they accumulate in the unit.

In the case of $CO_2$ capture in fumes from industrial units, electricity or more generally energy production units, amine-containing absorbent solution degradation phenomena are increased by the presence of a massive amount of oxygen in the feed to be treated, up to 5 vol. % in general. In the case of fumes from natural gas combined cycles, the volume proportion of oxygen in the fumes can reach 15%.

The degraded solution is characterized by:
a decrease in the absorption of the acid compounds of the feed in relation to a fresh amine solution,
an increase in the density of the absorbent solution and in its viscosity, which can lead to a performance loss,
the formation of more volatile amines that pollute the treated gas and the acid gas from the regeneration stage: ammonia, methylamine, dimethylamine and trimethylamine, for example, depending on the nature of the amine used,
an accumulation of degradation products in the absorbent solution, which can require treating the degraded solution,
possible foaming problems due to the degradation products.

The degradation of the absorbent solution thus penalizes the performances and the smooth running of gas deacidizing units.

In order to overcome the degradation problem, for lack of limiting or suppressing the presence of oxygen in the absorbent solution, compounds whose purpose is to prevent or to limit amine compounds degradation, notably the degradation generated by oxidation phenomena, are added to the absorbent solution. These compounds are commonly referred to as degradation inhibiting agents. The main known modes of action of degradation inhibiting agents are, depending on their nature, a reaction of reduction type and/or capture, trapping and/or stabilization of the radicals formed in the absorbent solution in order to limit or to prevent, or to stop, the degradation reactions, notably chain reactions.

U.S. Pat. No. 5,686,016 and U.S. Pat. No. 7,056,482 mention additives used for limiting the degradation of absorbent solutions respectively used for natural gas deacidizing and $CO_2$ capture.

SUMMARY OF THE INVENTION

In general terms, the present invention provides a family of degradation inhibiting agents allowing notably to reduce the degradation of an absorbent solution used for absorption of acid compounds contained in a gaseous effluent, the absorbent solution comprising amine compounds in aqueous solution.

The absorbent solution according to the invention for absorbing the acid compounds of a gaseous effluent comprises:
a) at least one amine,
b) water,
c) at least one degradation inhibiting compound for limiting the degradation of said amine, the degradation inhibiting compound having the general formula as follows:

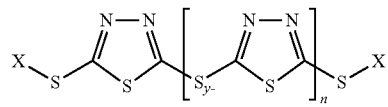

wherein X is selected from the group containing:
a hydrogen atom,
a hydrocarbon group containing 1 to 20 carbon atoms,
an alkaline element,
an alkaline-earth element,
a monovalent metal,
a multivalent metal,
an ammonium,
and wherein:
y ranges between 1 and 4,
n ranges between 0 and 4.

According to the invention, X can be a hydrocarbon group containing between 1 and 20 carbon atoms and including at least one heteroatom.

The solution can comprise between 10 wt. % and 80 wt. % amine, between 10% and 90% water, and between 5 ppm and 5 wt. % degradation inhibiting compound.

The degradation inhibiting compound can be selected from the group containing: 5,5'-dithiobis(1,3,4-thiadiazole-2(3H)-thione), a 5,5'-dithiobis(1,3,4-thiadiazole-2(3H)-thione) salt, 2,5-dimercapto-1,3,4-thiadiazole, a 2,5-dimercapto-1,3,4-thiadiazole salt, 5-(methylthio)-1,3,4-thiadiazole-2-thiol, a 5-(methylthio)-1,3,4-thiadiazole-2-thiol salt, 5-(ethylthio)-1,3,4-thiadiazole-2-thiol and a 5-(ethylthio)-1,3,4-thiadiazole-2-thiol salt.

The amine can be selected from the group containing: N,N,N',N',N"-pentamethyldiethylenetriamine, piperazine, monoethanolamine, diethanolamine, methyldiethanolamine, diisopropanolamine, diglycolamine, a glycine salt and a taurine salt.

In cases where the amine is monoethanolamine, the degradation inhibiting compound can be selected from among 5,5'-dithiobis(1,3,4-thiadiazole-2(3H)-thione), 5,5'-dithiobis(1,3,4-thiadiazole-2(3H)-thione) sodium salt, 2,5-dimercapto-1,3,4-thiadiazole and 2,5-dimercapto-1,3,4-thiadiazole sodium salt.

The invention also provides a method for absorbing acid compounds contained in a gaseous effluent, wherein the gaseous effluent is contacted with an aqueous solution comprising at least one amine and wherein the degradation of said amine is controlled by introducing at least one degradation inhibiting compound having the general formula as follows:

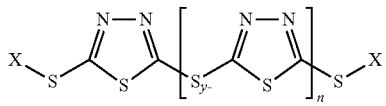

wherein X is selected from the group containing:
a hydrogen atom,
a hydrocarbon group containing 1 to 20 carbon atoms,
an alkaline element,
an alkaline-earth element,
a monovalent metal,
a multivalent metal,
an ammonium,
and wherein:
y ranges between 1 and 4,
n ranges between 0 and 4.

In the method according to the invention, the aqueous solution can be used to absorb acid compounds contained in one of the effluents of the group consisting of natural gas, combustion fumes, synthesis gases, refinery gases, Claus tail gases, biomass fermentation gases, cement plant gases and incinerator fumes.

At least one degradation inhibiting compound selected from the following group can be added to the aqueous solution: 5,5'-dithiobis(1,3,4-thiadiazole-2(3H)-thione), a 5,5'-dithiobis(1,3,4-thiadiazole-2(3H)-thione) salt, 2,5-dimercapto-1,3,4-thiadiazole, a 2,5-dimercapto-1,3,4-thiadiazole salt, 5-(methylthio)-1,3,4-thiadiazole-2-thiol, a 5-(methylthio)-1,3,4-thiadiazole-2-thiol salt, 5-(ethylthio)-1,3,4-thiadiazole-2-thiol and a 5-(ethylthio)-1,3,4-thiadiazole-2-thiol salt.

In order to limit the degradation of the monoethanolamine in aqueous solution used to capture the $CO_2$ of the combustion fumes, at least one degradation inhibiting compound from the following group can be added: 5,5'-dithiobis(1,3,4-thiadiazole-2(3H)-thione), 5,5'-dithiobis(1,3,4-thiadiazole-2(3H)-thione) sodium salt, 2,5-dimercapto-1,3,4-thiadiazole, 2,5-dimercapto-1,3,4-thiadiazole sodium salt.

DETAILED DESCRIPTION

Other features and advantages of the invention will be clear from reading the description hereafter.

In order to reduce the degradation of an absorbent solution, the inventors have shown that the degradation of an absorbent solution comprising organic compounds having an amine function in aqueous solution is substantially reduced in the presence of a small amount of degradation inhibiting agents as described hereafter.

The degradation inhibiting agents according to the invention are thiadiazole-derived organic compounds defined by the general formula as follows:

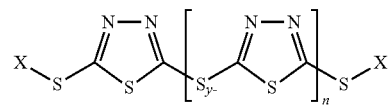

wherein X is selected from the group containing:
a hydrogen atom,
a hydrocarbon group containing 1 to 20 carbon atoms, preferably 1 to 6 carbon atoms, and the hydrocarbon group can contain one or more heteroatoms,
an alkaline element, in particular sodium, potassium and lithium,
an alkaline-earth element,
a monovalent metal,
a multivalent metal, in particular copper,
an ammonium defined in a broad sense as the product of the protonation or the quaternization of a molecule containing at least one nitrogen atom,
and wherein:
y ranges between 1 and 4, preferably between 1 and 2,
n ranges between 0 and 4, preferably between 0 and 1.
When n is greater than 1, unit

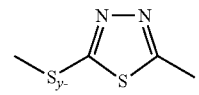

is repeated n times, the value of y is identical or different from one unit to the next.

The absorbent solutions according to the invention can be used to deacidize the following gaseous effluents: natural gas, synthesis gases, combustion fumes, refinery gases, Claus tail gases, biomass fermentation gases, cement plant gases and incinerator fumes. These gaseous effluents contain one or more acid compounds as follows: $CO_2$, $H_2S$, mercaptans, COS, $SO_2$, $NO_2$, $CS_2$. The combustion fumes are produced notably by the combustion of hydrocarbons, of biogas, of coal in a boiler or for a combustion gas turbine, for example in order to produce electricity. These fumes can comprise between 50% and 80% nitrogen, between 5% and 20% carbon dioxide, and between 1% and 10% oxygen.

Using an absorbent solution to deacidize a gaseous effluent is generally achieved by carrying out an absorption stage followed by a regeneration stage. The absorption stage consists in contacting the gaseous effluent with the absorbent solution. Upon contacting, the organic compounds having an amine function of the absorbent solution react with the acid compounds contained in the effluent so as to obtain a gaseous effluent depleted in acid compounds and an absorbent solution enriched in acid compounds. The regeneration stage notably consists in heating and optionally in expanding at least part of the acid compound-enriched absorbent solution in order to release the acid compounds in gas form. The regenerated absorbent solution, i.e. depleted in acid compounds, is recycled to the absorption stage.

The absorbent solution according to the invention comprises organic compounds in aqueous solution. Generally, the organic compounds are amines, i.e. they comprise at least one amine function. The organic compounds can come in variable concentrations, ranging for example between 10 wt. % and 80 wt. %, preferably between 20 wt. % and 60 wt. %, in the aqueous solution. The absorbent solution can contain between 10% and 90% water.

For example, the organic compounds are amines such as N,N,N',N',N"-pentamethyldiethylenetriamine or piperazine. For example, piperazine is used for natural gas treatment and combustion fumes decarbonation.

The organic compounds can also be alkanolamines such as monoethanolamine (MEA), diethanolamine (DEA), methyldiethanolamine (MDEA), diisopropanolamine (DIPA) or diglycolamine. Preferably, MDEA and DEA are commonly used for natural gas deacidizing. MEA is more particularly used for combustion fumes decarbonation.

The organic compounds can also be amino-acid salts such as glycine or taurine salts, which are notably used for $CO_2$ capture in combustion fumes.

Besides, the absorbent solution according to the invention can contain compounds that absorb physically at least partly one or more acid compounds of the gaseous effluent. For example, the absorbent solution can comprise between 5 wt. % and 50 wt. % absorbent compounds of physical character, such as methanol, sulfolane or N-formyl morpholine.

The following degradation inhibiting agents are preferably selected from among all the molecules corresponding to the general formula described above: 5,5'-dithiobis(1,3,4-thiadiazole-2(3H)-thione), a 5,5'-dithiobis(1,3,4-thiadiazole-2(3H)-thione) salt (in particular sodium, potassium, lithium, copper or ammonium salt of 5,5'-dithiobis(1,3,4-thiadiazole-2(3H)-thione), 2,5-dimercapto-1,3,4-thiadiazole, a 2,5-dimercapto-1,3,4-thiadiazole salt (in particular sodium, potassium, lithium, copper or ammonium salt of 2,5-dimercapto-1,3,4-thiadiazole), 5-(methylthio)-1,3,4-thiadiazole-2-thiol), a 5-(methylthio)-1,3,4-thiadiazole-2-thiol) salt (in particular sodium, potassium, lithium, copper or ammonium salt of 5-(methylthio)-1,3,4-thiadiazole-2-thiol), 5-(ethylthio)-1,3,4-thiadiazole-2-thiol and a 5-(ethylthio)-1,3,4-thiadiazole-2-thiol salt (in particular sodium, potassium, lithium, copper or ammonium salt of 5-(ethylthio)-1,3,4-thiadiazole-2-thiol). The following products are preferably selected from this list of degradation inhibiting products: 5,5'-dithiobis(1,3,4-thiadiazole-2(3H)-thione), 5,5'-dithiobis(1,3,4-thiadiazole-2(3H)-thione) sodium salt, 2,5-dimercapto-1,3,4-thiadiazole, 2,5-dimercapto-1,3,4-thiadiazole sodium salt.

The aforementioned degradation inhibiting agents are particularly well suited for prevention of the degradation of amines in aqueous solution used for capture of the $CO_2$ contained in combustion fumes.

One of the following compounds can be preferably used in order to limit the degradation of an absorbent solution consisting of alkanolamine, in particular monoethanolamine (MEA), in aqueous solution for capture of the $CO_2$ contained in combustion fumes: 5,5'-dithiobis(1,3,4-thiadiazole-2(3H)-thione), 5,5'-dithiobis(1,3,4-thiadiazole-2(3H)-thione) sodium salt, 2,5-dimercapto-1,3,4-thiadiazole, 2,5-dimercapto-1,3,4-thiadiazole sodium salt.

The absorbent solution according to the invention comprises an amount of degradation inhibiting agents defined by the general formula described above. The absorbent solution can comprise one or more different degradation inhibiting agents corresponding to said general formula. Furthermore, in the absorbent solution, the degradation inhibiting agents according to the invention can be associated with other degradation inhibiting compounds of different chemical families. According to the invention, the absorbent solution comprises between 5 ppm and 5 wt. % degradation inhibiting agents according to the invention, preferably between 50 ppm and 2 wt. %, and an excellent proportion of degradation inhibiting agents in the solution ranges between 100 ppm and 1 wt. %.

The examples given hereafter allow to compare and to illustrate the performances of the degradation inhibiting agents according to the invention, in terms of degradation reduction of the amines in aqueous solution.

The degradation tests on an amine in aqueous solution are carried out according to the following method of operation.

100 ml of a 30 wt. % amine solution in deionized water are placed in a glass reactor topped by a condenser to prevent evaporation of the water. According to the tests, the degradation inhibiting agent incorporated to the aqueous amine solution is varied. The reactor is heated to 80° C. in an electric block heater. The solution is stirred at 1200 rpm by a magnetic bar. The presence of counter-blades prevents formation of a vortex. 7 Nl/h atmospheric air, i.e. non-purified ambient air, are contacted with the solution by means of a plunger tube for 7 days at atmospheric pressure. The solution thus degraded is analyzed by ion chromatography. The analytical method uses an anion exchange column, a potash eluent and conductimetric detection. This analysis allows to quantify the acetate, oxalate and formiate ions, which are the species generally monitored by the person skilled in the art because they testify to the amine degradation ratio. The proportions in ppm of these various anions are given in the table below in the case of a 30 wt. % aqueous monoethanolamine (MEA) solution without a degradation inhibitor, with 1 wt. % of a conventional degradation inhibitor (hydroquinone) and with 1 wt. % of 5,5'-dithiobis(1,3,4-thiadiazole-2(3H)-thione), 5,5'-dithiobis(1,3,4-thiadiazole-2(3H)-thione) sodium salt, 2,5-dimercapto-1,3,4-thiadiazole and 2,5-dimercapto-1,3,4-thiadiazole sodium salt.

| Additive name | Additive wt. % | Acetate ppm | Formiate ppm | Oxalate ppm |
|---|---|---|---|---|
| — | 0% | 51 | 3910 | 197 |
| hydroquinone | 1% | 189 | 17063 | 3450 |
| 5,5'-dithiobis(1,3,4-thiadiazole-2(3H)-thione) | 1% | ND | 159 | ND |
| 2,5-dimercapto-1,3,4-thiadiazole | 1% | ND | 89 | ND |
| 5,5'-dithiobis(1,3,4-thiadiazole-2(3H)-thione) sodium salt | 1% | ND | 140 | ND |
| 2,5-dimercapto-1,3,4-thiadiazole sodium salt | 1% | ND | 33 | ND |

ND: non-determined value because below the detection limit of the analysis method for a given dilution of the sample analyzed.

This comparative example shows that using a conventional degradation inhibitor, hydroquinone, increases MEA degradation whereas the use of degradation inhibitors according to the invention allows to considerably limit MEA degradation under the conditions of the example.

The invention claimed is:

1. An absorbent solution for absorbing acid compounds of a gaseous effluent, said solution comprising:
  a) at least one amine,
  b) water,
  c) at least one degradation inhibiting compound for limiting the degradation of said amine, the degradation inhibiting compound having the following general formula:

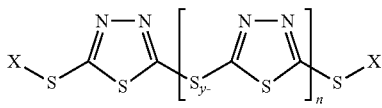

wherein X is selected from the group consisting of a hydrogen atom, a hydrocarbon group containing 1 to 20 carbon atoms, a hydrocarbon group containing between 1 and 20 carbon atoms and including at least one heteroatom, an alkaline element, an alkaline-earth element, a monovalent metal, a multivalent metal, and an ammonium, wherein:

y ranges between 1 and 4, n ranges between 0 and 4, and wherein the solution comprises between 10 wt. % and 80 wt. % amine, between 10% and 90% water, and between 5 ppm and 5 wt. % degradation inhibiting compound.

2. The absorbent solution as claimed in claim 1, wherein X is a hydrocarbon group containing between 1 and 20 carbon atoms, and including at least one heteroatom.

3. The absorbent solution as claimed in claim 1, wherein the degradation inhibiting compound is selected from the group consisting of: 5,5'-dithiobis(1,3,4-thiadiazole-2(3H)-thione), a 5,5'-dithiobis(1,3,4-thiadiazole-2(3H)-thione) salt, 2,5-dimercapto-1,3,4-thiadiazole, a 2,5-dimercapto-1,3,4-thiadiazole salt, 5-(methylthio)-1,3,4-thiadiazole-2-thiol, a 5-(methylthio)-1,3,4-thiadiazole-2-thiol salt, 5-(ethylthio)-1,3,4-thiadiazole-2-thiol and a 5-(ethylthio)-1,3,4-thiadiazole-2-thiol salt.

4. The absorbent solution as claimed in claim 1, wherein the amine is selected from the group consisting of N,N,N',N',N''-pentamethyldiethylenetriamine, piperazine, monoethanolamine, diethanolamine, methyldiethanol-amine, diisopropanolamine, diglycolamine, a glycine salt and a taurine salt.

5. The absorbent solution as claimed in claim 1, wherein the amine is monoethanolamine and wherein the degradation inhibiting compound is selected from the group consisting of 5,5'-dithiobis(1,3,4-thiadiazole-2(3H)-thione), 5,5'-dithiobis(1,3,4-thiadiazole-2(3H)-thione) sodium salt, 2,5-dimercapto-1,3,4-thiadiazole and 2,5-dimercapto-1,3,4-thiadiazole sodium salt.

6. A method for absorbing acid compounds contained in a gaseous effluent, wherein the gaseous effluent is contacted with an aqueous solution comprising at least one amine and wherein the degradation of said amine is controlled by introducing at least one degradation inhibiting compound having the general formula as follows:

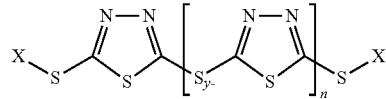

wherein X is selected from the group consisting of:
a hydrogen atom,
a hydrocarbon group containing 1 to 20 carbon atoms,
a hydrocarbon group containing between 1 and 20 carbon atoms and including at least one heteroatom,
an alkaline element,
an alkaline-earth element,
a monovalent metal,
a multivalent metal, and
an ammonium,
and wherein:
y ranges between 1 and 4,
n ranges between 0 and 4, and
wherein the solution comprises between 10 wt. % and 80 wt. % amine, between 10% and 90% water, and between 5 ppm and 5 wt. % degradation inhibiting compound.

7. A method as claimed in claim 6, wherein the aqueous solution is used to absorb acid compounds contained in one of the effluents of the group consisting of natural gas, combustion fumes, synthesis gases, refinery gases, Claus tail gases, biomass fermentation gases, cement plant gases and incinerator fumes.

8. A method as claimed in claim 6, wherein at least one degradation inhibiting compound selected from the following group is added to the aqueous solution: 5,5'-dithiobis(1,3,4-thiadiazole-2(3H)-thione), a 5,5'-dithiobis(1,3,4-thiadiazole-2(3H)-thione) salt, 2,5-dimercapto-1,3,4-thiadiazole, a 2,5-dimercapto-1,3,4-thiadiazole salt, 5-(methylthio)-1,3,4-thiadiazole-2-thiol, a 5-(methylthio)-1,3,4-thiadiazole-2-thiol salt, 5-(ethylthio)-1,3,4-thiadiazole-2-thiol and a 5-(ethylthio)-1,3,4-thiadiazole-2-thiol salt.

9. A method as claimed in claim 6 wherein, in order to limit the degradation of the monoethanolamine in aqueous solution used to capture the $CO_2$ of combustion fumes, at least one degradation inhibiting compound from the following group is added to the aqueous solution: 5,5'-dithiobis(1,3,4-thiadiazole-2(3H)-thione), 5,5'-dithiobis(1,3,4-thiadiazole-2(3H)-thione) sodium salt, 2,5-dimercapto-1,3,4-thiadiazole, 2,5-dimercapto-1,3,4-thiadiazole sodium salt.

\* \* \* \* \*